United States Patent
Liu (10) Patent No.: US 8,582,123 B2
(45) Date of Patent: Nov. 12, 2013

(54) APPARATUS FOR DETERMINING THICKNESS OF A BANKNOTE

(75) Inventor: Donald Pakman Liu, Hong Kong (HK)

(73) Assignee: Accolade Electronics Company Limited, Hong Kong (HK)

(*) Notice: Subject to any disclaimer, the term of this patent is extended or adjusted under 35 U.S.C. 154(b) by 114 days.

(21) Appl. No.: 13/211,112

(22) Filed: Aug. 16, 2011

(65) Prior Publication Data

US 2012/0057147 A1  Mar. 8, 2012

Related U.S. Application Data (60) Provisional application No. 61/379,954, filed on Sep. 3, 2010.

(51) Int. Cl.
*G01B 11/28* (2006.01)
*G01B 11/06* (2006.01)

(52) U.S. Cl.
CPC ................................. *G01B 11/0625* (2013.01)
USPC .......................................................... 356/630

(58) Field of Classification Search
CPC ............................. G01B 11/28; G01B 11/0625
USPC .......................................................... 356/630
See application file for complete search history.

(56) References Cited

U.S. PATENT DOCUMENTS

| | | | |
|---|---|---|---|
| 4,121,716 A * | 10/1978 | Luperti et al. | 209/564 |
| 4,420,153 A * | 12/1983 | Winkler et al. | 271/304 |
| 4,550,252 A * | 10/1985 | Tee | 250/223 R |
| 6,903,358 B2 | 6/2005 | Kim | |
| 7,487,069 B2 * | 2/2009 | Vogler et al. | 702/189 |
| 2003/0209657 A1 | 11/2003 | Vejtasa | |
| 2004/0218802 A1 * | 11/2004 | Suzuki | 382/137 |
| 2005/0285057 A1 * | 12/2005 | Mukai | 250/559.4 |
| 2005/0285325 A1 * | 12/2005 | Mukai | 271/10.11 |
| 2007/0052978 A1 * | 3/2007 | Pingel et al. | 356/632 |
| 2010/0277748 A1 * | 11/2010 | Potapenko | 356/623 |

FOREIGN PATENT DOCUMENTS

| CN | 1065336 | 5/2001 |
|---|---|---|
| CN | 101398295 | 4/2009 |

* cited by examiner

*Primary Examiner* — Michael P Stafira
(74) *Attorney, Agent, or Firm* — Muncy, Geissler, Olds & Lowe, PLLC (57) ABSTRACT

An apparatus (100) for determining thickness of a banknote (1), comprising: a light generator (8) to emit a light beam (12); and a sensor array (10) to detect at least a portion of the emitted light beam (12); wherein the thickness of the banknote (1) is determined by detection of a change from a predetermined position of the emitted light beam (12) by the sensor array (10).

19 Claims, 7 Drawing Sheets

APPARATUS FOR DETERMINING
THICKNESS OF A BANKNOTE

This nonprovisional application claims priority under 35 U.S.C. §119(e) to U.S. provisional Patent Application Ser. No. 61/379,954, which was filed on Sep. 3, 2010, and which is herein incorporated by reference.

TECHNICAL FIELD

The invention concerns an apparatus and method for determining thickness of a banknote.

BACKGROUND OF THE INVENTION

A cash dispenser is an electro-mechanical apparatus that is used inside a cash machine to dispense paper money upon request. A cash dispenser normally consists of a control logic board, a communication port to host machine, a motorized transfer mechanism, for example, motors, belts, rollers, and pulleys, and an array of multiple cash cassettes.

U.S. Pat. No. 6,903,358 discloses using a very small analog signal achieved from using a light sensor. However, the movement of the slit to shade the light amount falling on the sensor is very small. Thus, the voltage changes from the sensor requires large amplification and yields low SNR.

A Rotary Variable Differential Transformer (RVDT) may be used for angular detection of the idler deflection angle. The mechanical arms and links to turn the RVDT is subject to slop. The finite mass of the mechanical arms and links add significant inertia to the motion causing a delay in initial movement and an overshoot at peak angle. The pendulum effect of the mass gives a ringing (decaying oscillation) signal. RVDT is easily affected by a nearby magnetic field (for example, the driving motor or solenoid). The signal output is an AC signal that requires complex and fast circuit for momentary signal capture.

A cash dispenser has a mechanical system to remove a single piece of banknote one at a time from a stack inside the cash cassette, usually by frictional rollers and pressure plates. However if this mechanical system fails due to different humidity levels, or mechanical aging (for example, the material of the rollers become old and stiff), two or more banknotes are likely to be removed at the same time. It is desirable to provide an apparatus to detect if this situation occurs to improve reliability of the cash dispenser. Therefore a new detection method is important for all paper-like media handling machines.

SUMMARY OF THE INVENTION

In a first preferred aspect, there is provided an apparatus for determining thickness of a banknote, comprising:
a light generator to emit a light beam; and
a sensor array to detect at least a portion of the emitted light beam;
wherein the thickness of the banknote is determined by detection of a change from a predetermined position of the emitted light beam by the sensor array.

The change from a predetermined position of the emitted light beam may be caused by movement of the light generator by a deflection angle (θ) in response to the thickness of the paper substrate entering a path defined between an idler and a fixed roller, the idler being connected to a holder operatively attached to the light generator.

The idler may be connected to the holder by an idler arm.

The position of the idler may be displaced relative to the thickness of the paper substrate entering a path defined between an idler and a fixed roller.

The sensor array may have a resolution of at least 20 DPI.

The apparatus may further comprise an aperture control is placed in front of the light generator to control the size of the emitted light such that the width of the light beam is smaller than the size of an active area of the sensor array.

The aperture control may be any one from the group consisting of: convergence lens, a Powell lens, a slit and pinhole mask.

The light generator may be a laser diode, a visible light source or an invisible infrared emitter.

In a second aspect, there is provided a method for determining thickness of a banknote, the method comprising:
emitting at least a portion of a light beam onto a sensor array;
determining the thickness of the banknote by detection of a change from a predetermined position of the emitted light beam by the sensor array.

The light beam may be emitted by a light generator, and the change from a predetermined position of the emitted light beam is caused by movement of the light generator by a deflection angle (θ) in response to the thickness of the paper substrate entering a path defined between an idler and a fixed roller, the idler being connected to a holder operatively attached to the light generator.

BRIEF DESCRIPTION OF THE DRAWINGS

An example of the invention will now be described with reference to the accompanying drawings, in which.

DETAILED DESCRIPTION OF THE DRAWINGS

Figure 1:
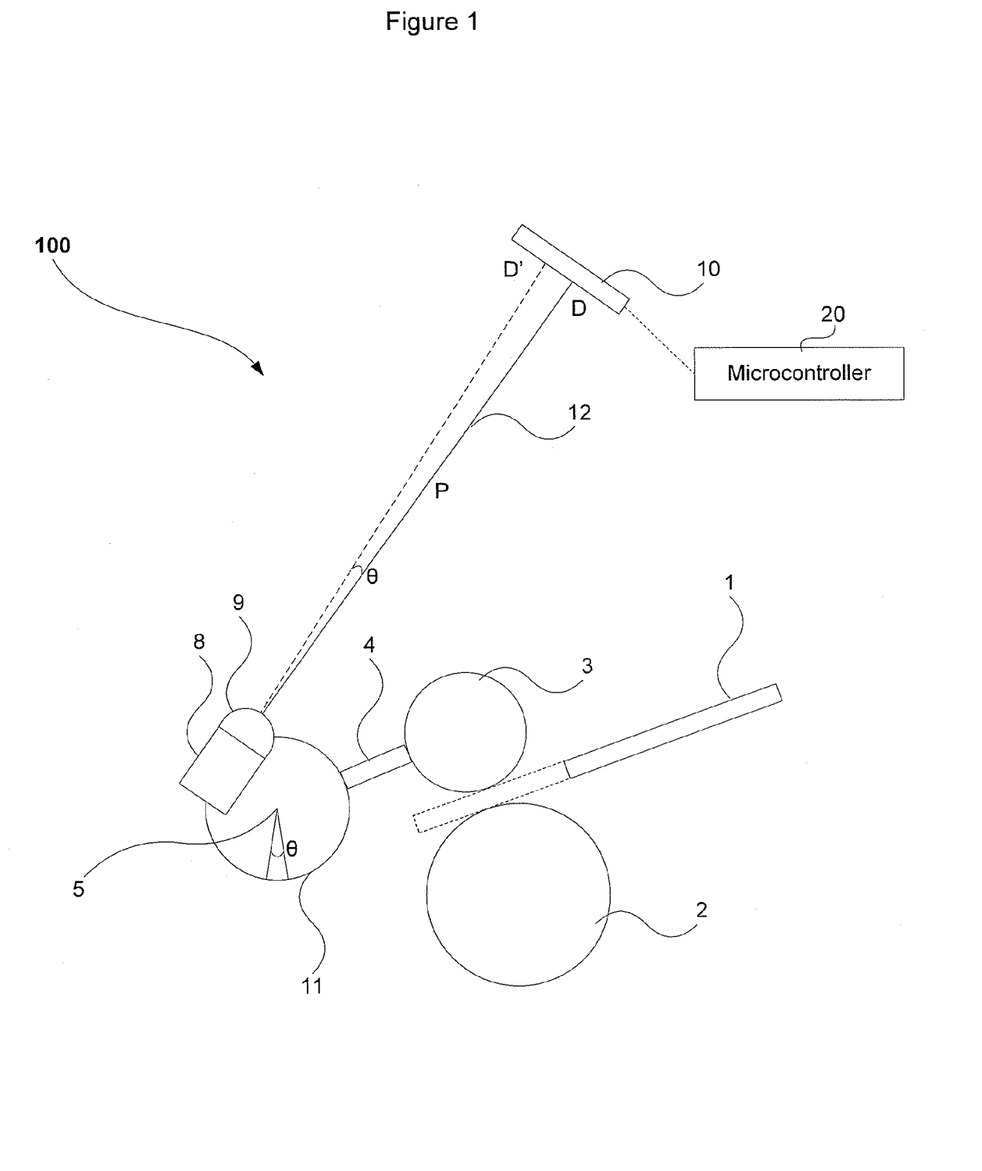
FIG. 1 is a block diagram of a cash dispenser apparatus in accordance with an embodiment of the present invention.
Figure 6:
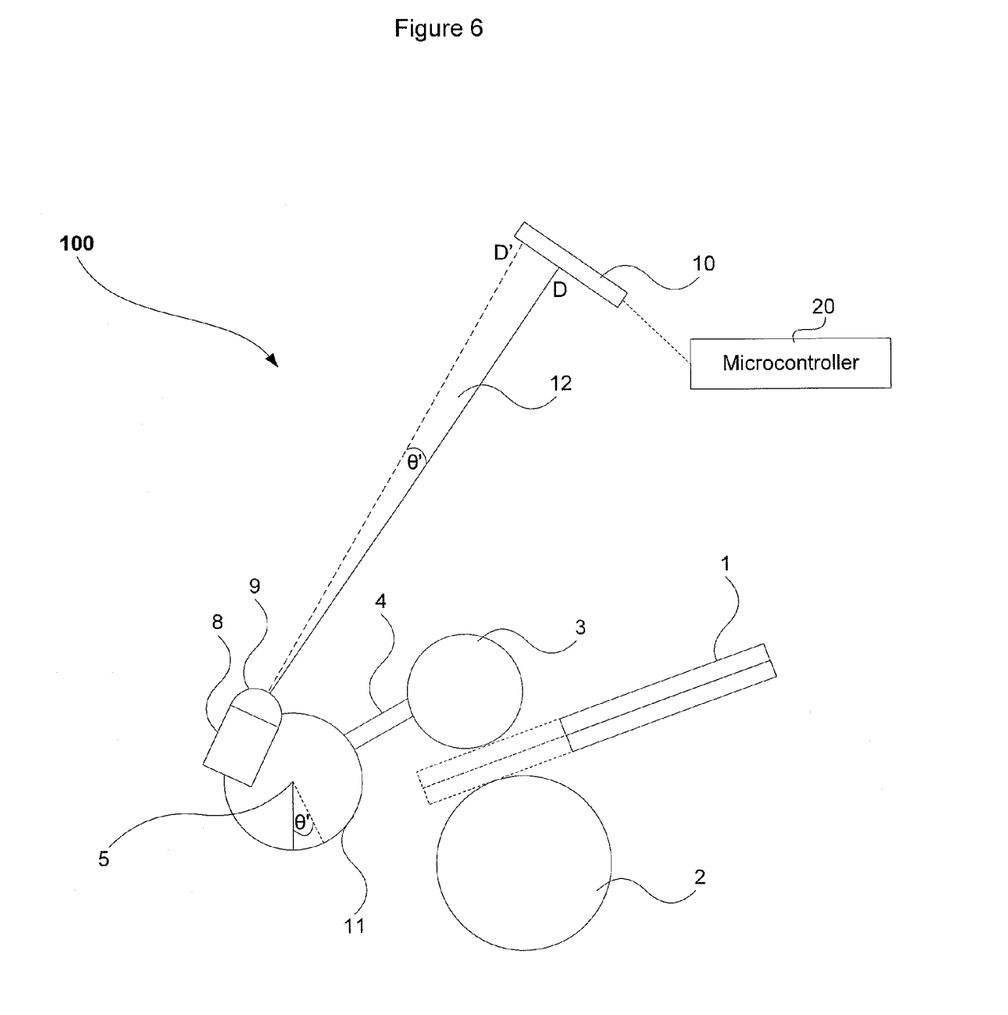
FIG. 6 is a block diagram showing when there are two banknotes together.
Figure 7:
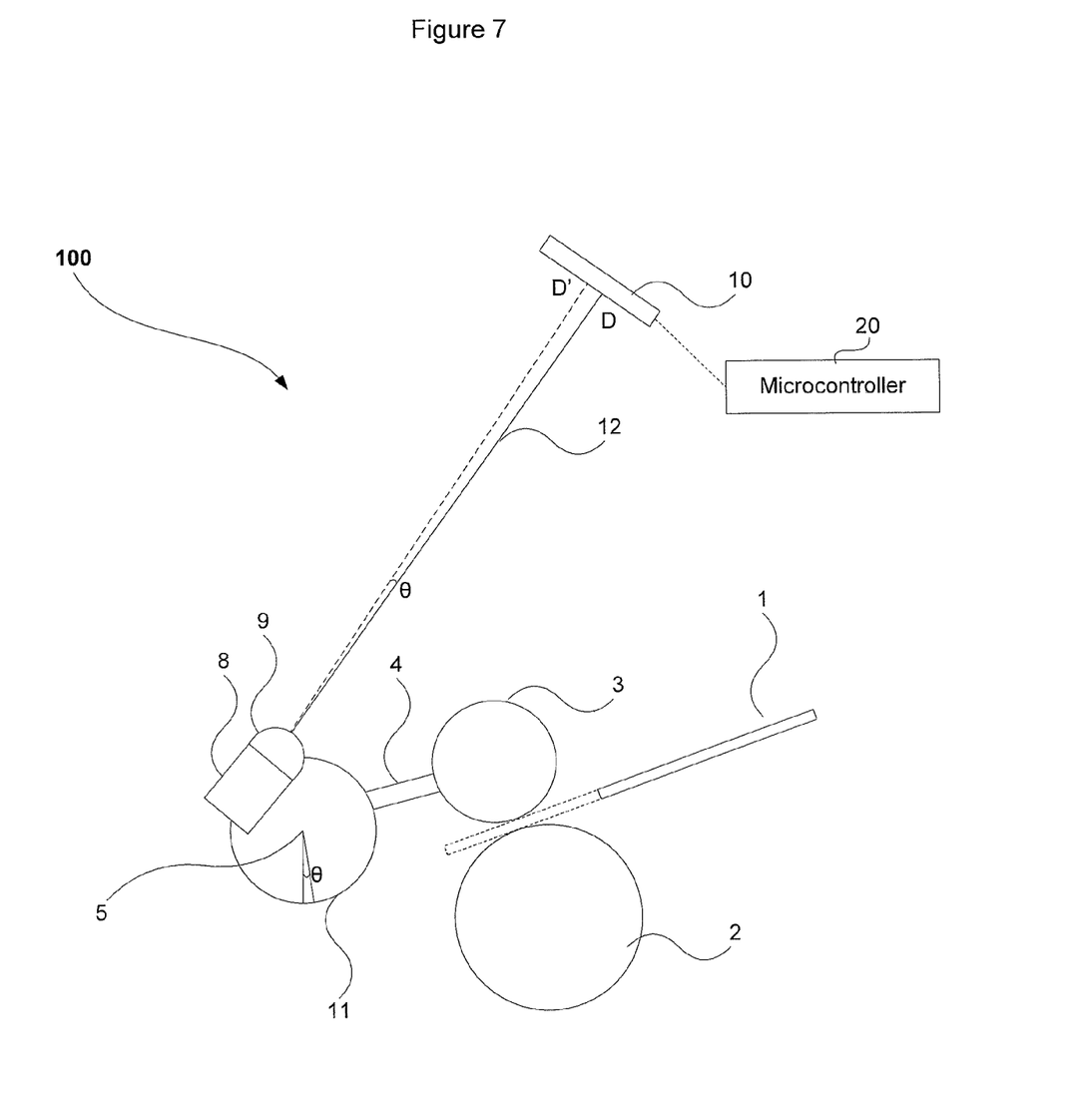
FIG. 7 is a block diagram showing when the paper substrate is thinner than normal (i.e. a different medium).

Referring to FIGS. 1, 6 and 7, a cash dispenser apparatus 100 is provided. The cash dispenser apparatus 100 generally comprises a light generator 8 and a distant sensor array 10. The light generator 8 is rigidly mounted on a holder 11. The deflection of a light beam emitted 12 by the light generator 8 that falls onto the sensor array 10 is used for the detection of the thickness of an incoming paper substrate 1. The cash dispensing apparatus 100 should be light proof from the ambient environment to keep the Signal-to-Noise ratio above an acceptable level.

The incoming paper 1 has a predetermined thickness (α) and follows a pathway defined between a fixed roller 2 and an idler 3. The position of the fixed roller 2 does not change and rotates about its rotational axis in order to move the paper substrate 1 along the pathway between the fixed roller 2 and idler. The idler 3 is attached to an idler arm 4 extending from a pivot point 5 (center) of the holder 11. The idler arm 4 is rigidly connected to both the holder 11 and the idler 3. This enables the transfer and translation of all linear motion of the idler 3 to the angular movement of the holder 11. The thickness ($\alpha$) of the incoming paper 1 will cause the position of the idler 3 to be displaced and in response, the idler arm 4 causes the holder 11 to rotate about the pivot point 5 by a deflection angle ($\theta$). For example, a thicker paper substrate 1 will cause greater displacement of the idler 3 which causes the deflection angle ($\theta$) to be larger. The larger deflection angle ($\theta$) in turn causes the emitted light beam 12 to laterally shift a greater distance.

The holder 11 is freely rotatable about the pivot point 5 by the deflection angle ($\theta$). The rotation of the holder 11 is caused by the idler 3 and the idler arm 4 in the presence of a paper substrate 1. The sensor array 10 is mounted at a distance (P) from the pivot point 5 of the holder 11.

The thickness of the paper substrate 1 refers to a measurement of the effective distance that the sensor arrangement has been set apart from a reference point. Thus, wrinkles on the paper substrate 1 will set the distance of the sensor arrangement farther than flat paper. The real thickness of the paper substrate 1 does not change in this case.

The sensor array 10 is a collective of photo sensing elements aligned together in a tight area either in a one dimensional linear orientation or a two dimensional area where each sensor element (pixels) 10A are in close vicinity to others and have similar electrical response toward a same incident light source. Outputs of each pixel are proportional to the amount of incident light falling on them. In other words, if an uneven light distribution is cast on the sensor array 10, a non-uniform output signal across the sensor array 10 is obtained. The output is a digital and/or analog voltage signal and later be processed by a microcontroller 20 or a comparator of the cash dispenser 100.

Turning to FIG. 6, in case of a wrinkle on the incoming paper substrate 1 or more than one paper substrate is stuck together, the larger effective thickness ($\alpha'$) of the paper substrate 1 will set a larger deflection angle ($\theta'$) and eventually causes a bigger linear displacement D'. D' lies within the area of the sensor array 10. In this case, the cash dispenser 100 can determine if a predetermined amount corresponding to the thickness of a single paper substrate 1 has been exceeded. Wrinkled paper or more than one paper stuck together can be routed to a bad paper path instead of a normal good paper path.

If D' is significantly greater than a predetermined amount corresponding to the known thickness of a single paper substrate 1, then the microcontroller 20 knows there is more than a single paper substrate 1 passing between the idler 3 and fixed roller 2.

Turning to FIG. 7, alternatively, in the case of D' being significantly smaller than a predetermined amount, the microcontroller 20 knows that there may not be single paper substrate 1 and it could be a different kind of media that is not made of paper or the media that is expected. This may be because there could be a wrong mix of paper substrates in the paper stack. The light generator 8 will be turned by deflection angle ($\theta$) and the light beam 12 is emitted perpendicular to the light generator 8.

In a first embodiment, the sensor array 10 is constructed by forming an array of photo-sensing elements 10A on a same piece of silicon substrate in high density, for example 200 to 1000 DPI pixel resolution and been packaged in a single IC format. This kind of formation can be found in sensor units like 2-D CCD or CMOS chips used in cameras or 1-D CCD or CIS units used in linear scanners. The active area formed by this method is roughly same size as the exposed silicon area on the IC for light detection.

In a second embodiment, the sensor array 10 is constructed by soldering discrete photo-sensors 10A onto a PCB or mounting them in a mechanical holder to form a bed of a closely populated photo-sensor assembly. The discrete photo-sensors 10A may be surface mounted photo-transistors or photo-diodes. This assembly, however gives a much lower pixel resolution (less than 20 DPI) as the die size of each discrete photo-sensor is much bigger than that of the first embodiment and its enclosure material makes it too bulky to fit a lot of them in a small area. Often there are gaps between each photo-sensor 10A and inaccuracy is introduced.

The light generator 8 generates an optical beam 12 from a light source such as a laser diode, a visible light source or an invisible infrared emitter. The light generator 8 is operated under a constant power source or a pulsed On-Off control circuit to converse energy and life of the light generator 8. An aperture control 9, for example a convergence lens or a slit or pinhole mask is placed in front of the light generator 8 to control the size of the optical beam so that the width of the illuminated spot is smaller than the size of the active area of the sensor array 10. In some embodiments, the aperture control is a Powell lens that produces improved line uniformity and is used to generate a straight line. The shape of the beam cast on the sensor array 10 is not important. However, it is important that the beam edge of one side or both sides must be within the active area of the sensor array 10 to give a threshold reading between brightness and darkness.

In the situation where there is no paper 1, the optical beam 12 emitted from the light generator 8 is cast on the sensor array 10 at position D. This gives a local maxima reading point at the center of D. Since the width of beam 12 is smaller than the width of the sensor array 10, the edge of the beam 12 generates a threshold level for position detection.

Figure 2:
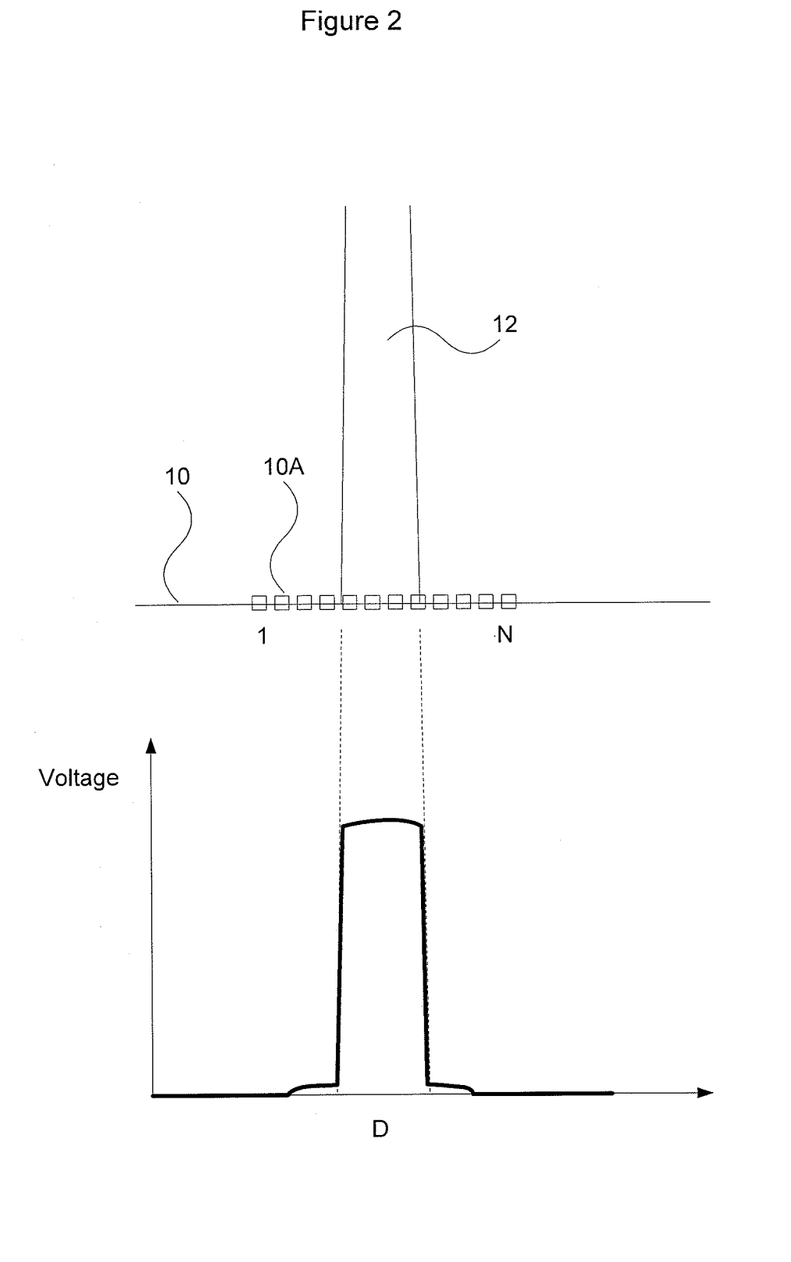
FIG. 2 is a chart depicting an optical beam falling on a sensor array and an associated voltage chart in accordance with an embodiment of the present invention.

Referring to FIG. 2, the entire width of the optical beam 12 falls on the sensor array 10. The voltage (electrical signal) of sensor elements 1 to N of the sensor array 10 gives a rising and falling edge as depicted in the chart. There is always a low noise level for no light and almost a saturated level in the illuminated area. There is no voltage signal before sensor element 1 and after element N in the sensor array 10.

Figure 3:
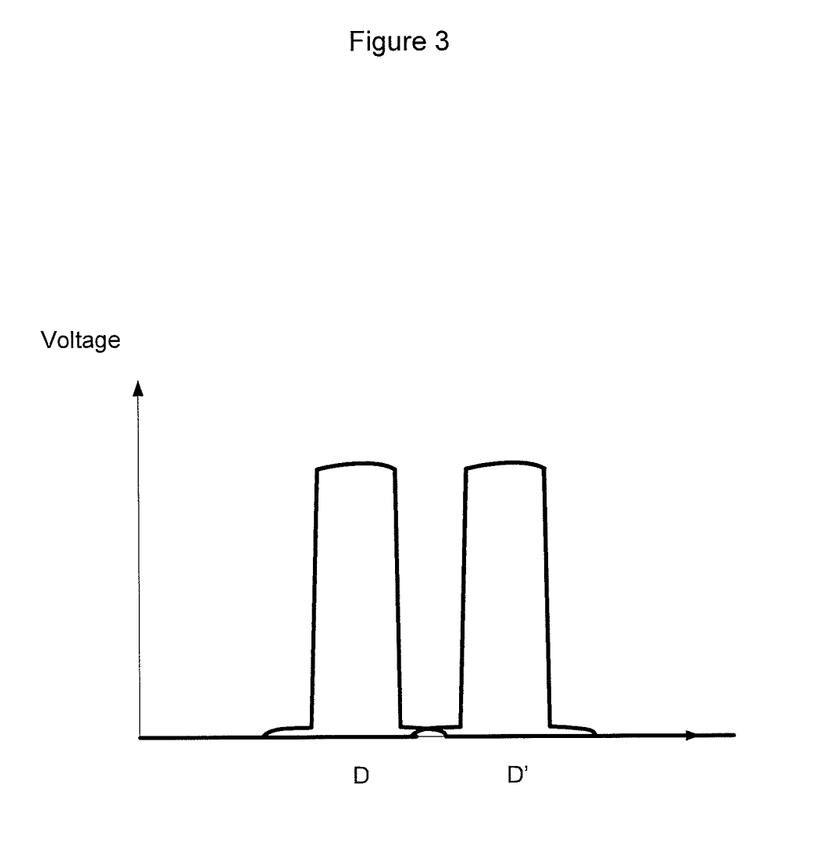
FIG. 3 is a voltage chart when a paper substrate is present in accordance with an embodiment of the present invention.

Referring to FIG. 3, when a paper substrate 1 is present, the deflection angle ($\theta$) shifts the optical beam 12 laterally to a new position (D'). The displacement (D') is dictated by the formula below:

$$D' = P \cdot \sin(\theta)$$

Assume: sensor array (10) is perpendicular to light beam 12 deflection angle $0° \leq \theta \leq 5°$ in most case

P=10cm

D'=P·sin(5°)

D'=P~0.08716

D'=0.8716 cm

Figure 4:
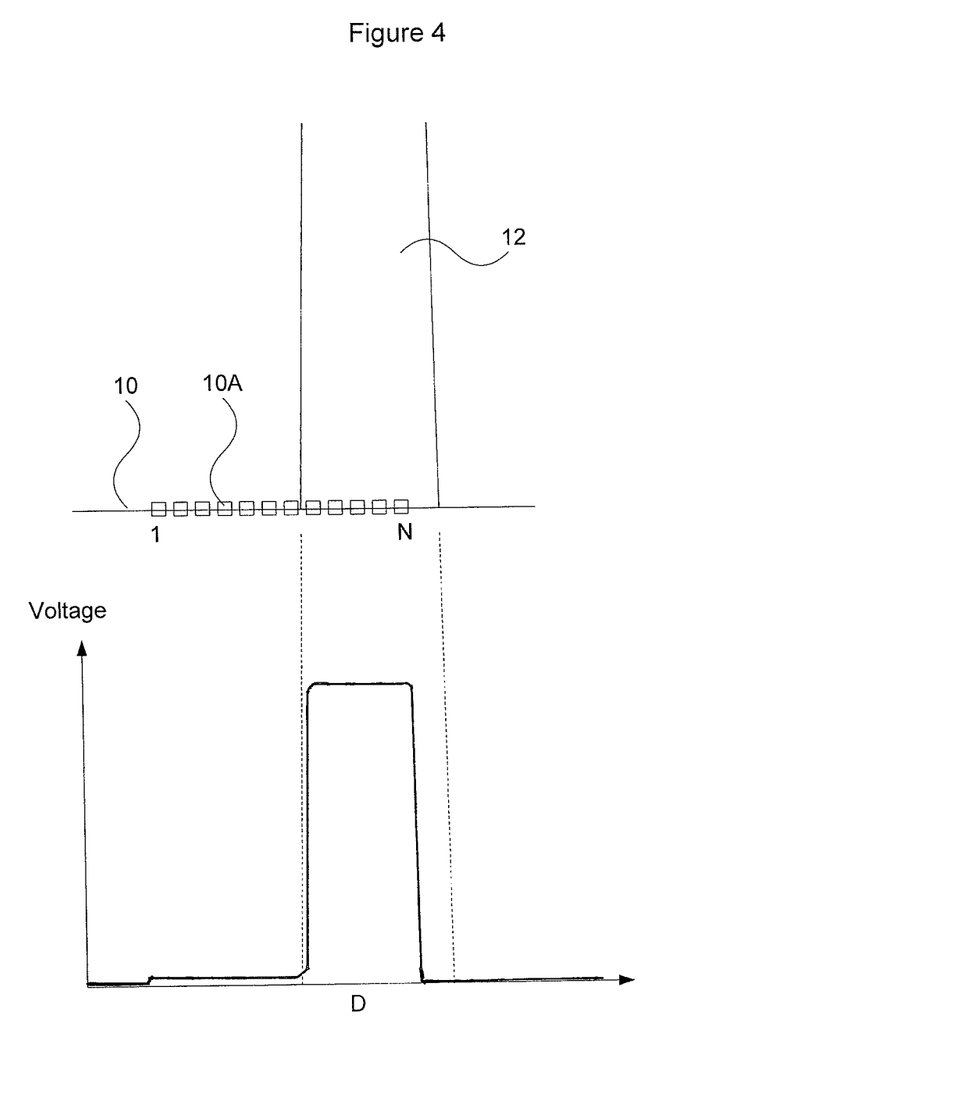
FIG. 4 is a chart depicting an off-center optical beam falling on a sensor array where part of illuminated area lies beyond sensor active area (element N) is not measured and an associated voltage chart in accordance with an embodiment of the present invention.

Referring to FIG. 4, an off-center light beam 12 falls on the sensor array 10. The voltage (electrical signal) of the sensor elements 1 to N of the sensor array 10 gives only one edge. This single edge is either a rising or falling edge. There is no voltage signal beyond sensor element N in the sensor array 10.

Figure 5:
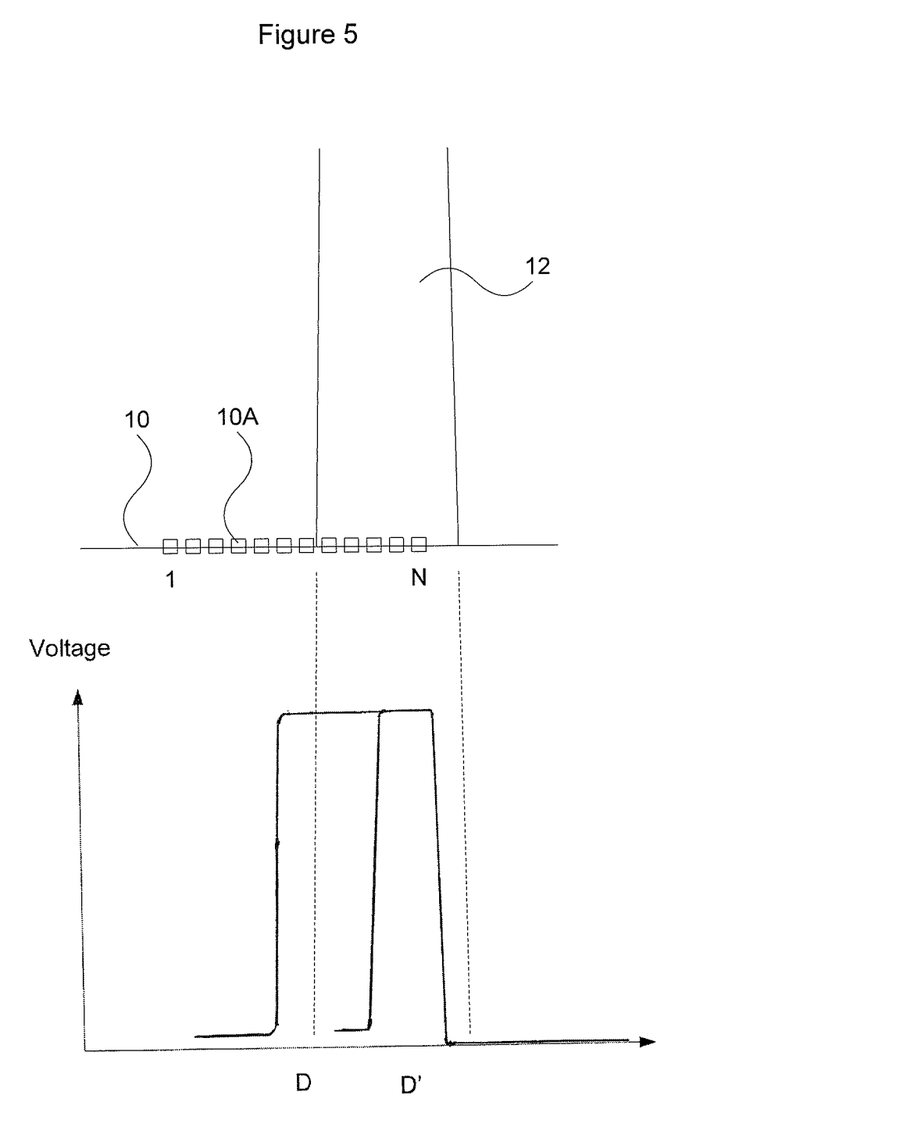
FIG. 5 is a voltage chart of an off-center optical beam where part of the illuminated area is beyond sensor active area when there is a different thickness of the paper substrate in accordance with an embodiment of the present invention.

Referring to FIG. 5, by the detection of the change in the position of the light edge of beam 12, the thickness of the paper substrate 1 can be determined by the cash dispenser 100. The resolution (DPI) of the sensor array 10 plays an important role. The higher DPI the sensor array 10 has, the more pixels between (D) and (D') will experience a change in local maxima and beam edges position. Thus an accurate result will be given to the cash dispenser 100 to determine the thickness of paper substrate 1. There is no voltage signal beyond element N in the sensor array 10.

The light generator 8 is light-weight and located close to the pivot point 5 of the holder 11. For example, a very bright LED 8 and a small plastic aperture 9 can be used as the light generator 8 and aperture control 9, respectively. Inertia and pendulum has little effect on idler 3, idler arm 4, holder 11, light generator 8, and aperture control 9. Provided the light beam 12 has enough power to reach the sensor array 10, the sensor distance P can be extended to as far as the longest dimension of the cash dispenser 100. This increases the magnitude of (D') displacement due to deflection angle ($\theta$) without significant drawbacks.

Although bank notes have been described, it is envisage that the present invention may be used for determining the thickness of other monetary negotiable instruments or promissory notes or paper coupons or tickets.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

I claim:

1. An apparatus for determining thickness of a banknote, comprising:
    a light generator to emit a light beam;
    a sensor array to detect at least a portion of the emitted light beam; and
    a microcontroller in communication with the sensor array, the microcontroller being configured to determine a thickness of the banknote, wherein the thickness is determined based on a deflection angle of the light beam on the sensor array.

2. An apparatus for determining thickness of a banknote, comprising:
    a light generator to emit a light beam; and
    a sensor array to detect at least a portion of the emitted light beam,
    wherein the thickness of the banknote is determined by detection of a change from a predetermined position of the emitted light beam by the sensor array, and
    wherein the change from a predetermined position of the emitted light beam is caused by movement of the light generator by a deflection angle ($\theta$) in response to the thickness of the paper substrate entering a path defined between an idler and a fixed roller, the idler being connected to a holder operatively attached to the light generator.

3. The apparatus according to claim 2, wherein the idler is connected to the holder by an idler arm.

4. The apparatus according to claim 3, wherein the position of the idler is displaced relative to the thickness of the paper substrate entering a path defined between an idler and a fixed roller.

5. The apparatus according to claim 1, wherein the sensor array has a resolution of at least 20 DPI.

6. The apparatus according to claim 1, further comprising an aperture control is placed in front of the light generator to control the size of the emitted light such that the width of the light beam is smaller than the size of an active area of the sensor array.

7. The apparatus according to claim 6, wherein the aperture control is any one from the group consisting of: convergence lens, a Powell lens, a slit and pinhole mask.

8. The apparatus according to claim 1, wherein the, light generator is a laser diode, a visible light source or an invisible infrared emitter.

9. A method for determining thickness of a banknote, the method comprising:
    emitting at least a portion of a light beam onto a sensor array;
    determining the thickness of the banknote, using a microcontroller in communication with the sensor array, wherein the thickness is determined based on a deflection angle of the light beam on the sensor array.

10. A method for determining thickness of a banknote, the method comprising:
    emitting at least a portion of a light beam onto a sensor array; and
    determining the thickness of the banknote by detection of a change from a predetermined position of the emitted light beam by the sensor array,
    wherein the light beam is emitted by a light generator, and the change from a predetermined position of the emitted light beam is caused by movement of the light generator by a deflection angle ($\theta$) in response to the thickness of the paper substrate entering a path defined between an idler and a fixed roller, the idler being connected to a holder operatively attached to the light generator.

11. A method for determining thickness of a banknote, the method comprising:
    emitting at least a portion of a light beam onto a sensor array; and
    determining the thickness of the banknote by detection of a change from a predetermined position of the emitted light beam by the sensor array,
    wherein emitting at least a portion of a light beam onto the sensor array comprises providing a light generator configured to emit the light beam and pivotably mounting the light generator relative to the sensor array such that the at least the portion of the light beam impinges upon the sensor array when light generator is pointed in a first direction.

12. The method according to claim 11, including moving a banknote along a transport path and into contact with an element operatively connected to the light generator and changing an angular orientation of the light generator relative to the sensor array by an amount related to a thickness of the banknote.

13. The method according to claim 12, wherein determining the thickness of the banknote comprises generating an output from the sensor array based on a position of the at least the portion of the light beam on the sensor array and providing the output to a microcontroller.

14. An apparatus for determining a thickness of a banknote, comprising:
    a pivotable support pivotable from a first angular position to a second angular position;
    a light generator mounted to the pivotable support, the light generator being configured to emit a light beam;
    a light sensor array positioned relative to the pivotable support such that the light beam emitted from the light generator impinges upon the light sensor array when the pivotable support is in the first angular position, the light sensor array being configured to produce an output related to a location of the light beam on the light sensor array;

a fixed roller partially defining with the pivotable support a travel path for the banknote, the banknote shifting the pivotable support angularly away from the first position when the banknote passes between the fixed roller and the pivotable support; and a microcontroller in communication with the light sensor array, the microcontroller being configured to determine a thickness of the banknote based on a position of the light beam on the light sensor array.

15. The apparatus according to claim 14, wherein the light generator comprises a light emitting diode.

16. The apparatus according to claim 14, wherein the light generator is fixed relative to the pivotable support and the pivotable support is pivotable relative to the light sensor array.

17. The apparatus according to claim 14, wherein the pivotable support comprises a pivotably mounted holder, an idler arm extending from the holder and an idler mounted to the idler arm, wherein the idler is positioned to be contacted by the banknote and wherein the idler and the fixed roller partially define the travel path.

18. The apparatus according to claim 17, wherein the light generator is mounted directly on the holder.

19. The apparatus according to claim 14, wherein the light generator is configured to emit visible light.

* * * * *